United States Patent
Kozak et al.

(10) Patent No.: US 6,494,307 B1
(45) Date of Patent: Dec. 17, 2002

(54) FLEXIBLE TRACK AND CARRIAGE SYSTEM

(75) Inventors: Daniel J. Kozak, Pittsburgh, PA (US); Anil N. Rodrigues, Pittsburgh, PA (US)

(73) Assignee: Weld Tooling Corporation, Pittsburgh, PA (US)

(*) Notice: Subject to any disclaimer, the term of this patent is extended or adjusted under 35 U.S.C. 154(b) by 0 days.

(21) Appl. No.: 09/508,498

(22) PCT Filed: Sep. 8, 1998

(86) PCT No.: PCT/US98/18896

§ 371 (c)(1),
(2), (4) Date: Mar. 8, 2000

(87) PCT Pub. No.: WO99/12786

PCT Pub. Date: Mar. 18, 1999

Related U.S. Application Data (60) Provisional application No. 60/058,235, filed on Sep. 8, 1997.

(51) Int. Cl.[7] .............. B65G 29/00; B65G 37/00; B65G 47/84; B65G 49/00; B61C 11/00
(52) U.S. Cl. .............. 198/465.1; 198/469.1; 105/29.1
(58) Field of Search .......... 198/465.1, 469.1, 198/735.6; 105/29.1, 141, 144; 238/123

(56) References Cited

U.S. PATENT DOCUMENTS

| | | | |
|---|---|---|---|
| 1,495,595 A | * 5/1924 | Jack | 105/29.1 X |
| 3,226,027 A | * 12/1965 | Cable et al. | 104/118 |
| 3,575,364 A | 4/1971 | Frederick | 248/2 |
| 3,589,205 A | * 6/1971 | Radovic | 105/127 |
| 3,656,364 A | * 4/1972 | Cable et al. | 105/29.1 X |
| 3,986,458 A | * 10/1976 | Kling | 104/172 S |
| 4,245,562 A | * 1/1981 | Knudsen | 104/172 S |
| 4,422,384 A | 12/1983 | Johnson et al. | 105/29 R |
| 4,570,542 A | 2/1986 | Cable et al. | 104/119 |
| 5,070,792 A | 12/1991 | Harris | 105/29.1 |
| 5,323,962 A | 6/1994 | Jassby et al. | 238/10 R |
| 5,562,043 A | 10/1996 | Gromes | 105/29.1 |
| 5,735,214 A | * 4/1998 | Tsuboi | 105/29.1 X |

FOREIGN PATENT DOCUMENTS

| | | | |
|---|---|---|---|
| JP | 2208162 | 8/1990 | B61C/13/08 |
| JP | 478649 | 3/1992 | B61B/13/02 |

* cited by examiner

Primary Examiner—Christopher P. Ellis
Assistant Examiner—Gene O. Crawford
(74) Attorney, Agent, or Firm—Webb Ziesenheim Logsdon Orkin & Hanson, P.C.

(57) ABSTRACT

A track and carriage system is provided for moving a work piece along a flexible track (10). The system includes a track (10) having at least one track segment (12), the track segment (12) including a rack assembly (16) formed by a plurality of spaced rack members (18) mounted on the track segment (12). A carriage assembly (40) is configured to move along the track (10). The carriage assembly (40) includes a first carriage (42) and a second carriage (44) which may be removably mounted on the track (10). A link assembly (48) extends between the two carriages (42, 44) to connect the two carriages as they Cove along the track (10).

21 Claims, 11 Drawing Sheets

FLEXIBLE TRACK AND CARRIAGE SYSTEM

This application claims the benefit of provisional application No. 60/058,235, filed Sep. 8, 1997

BACKGROUND OF THE INVENTION

1. Field of the Invention

This invention relates generally to the field of flexible tracks and, more particularly, to a flexible track and carriage system for guiding and supporting a tool, such as a welding or cutting machine, along a work surface.

2. Description of the Prior Art

Track systems are known in the art for guiding a welding or cutting machine on a work surface. Such track systems are used in many industrial areas, such as structural steel work, machinery manufacture and repair, ship building and ship repair, containment vessels, tubing, conductors, etc. In some cases, a rigid track or rail system is used. However, in many cases, a flexible rail system is advantageous to allow the welding or cutting machine to traverse a non-planar i.e., curved work surface. A flexible rail system allows the rail to be used over straight as well as curved surfaces.

One example of such a prior track system is disclosed in U.S. Pat. No. 4,570,542 to Cable et al., which is herein incorporated by reference. In the Cable patent, a band of corrugated sheet metal is attached to the top of a track base. The corrugations of the band form a rack having vertically oriented teeth. The large, vertically oriented drive gear of a welding or cutting machine is configured to engage the vertically oriented teeth of the corrugated band to move the machine along the rack. Since the corrugated band forming the teeth must be able to flex with the track to conform to the shape of the work surface, the thickness of the band, and hence the thickness of the teeth, must necessarily be limited to permit such flexibility. This limits the amount of force which can be applied to the teeth and hence the load which the track is capable of directing. Such vertically oriented, unitary track systems are generally capable of supporting and directing loads only on the order of about 30 pounds. Additionally, the use of a large, vertically oriented gear wheel having an axis of rotation parallel to the top of the track makes the design of a drive system awkward and cumbersome.

Another track system is disclosed in U.S. Pat. No. 5,070,792 to Harris. In the Harris system, a flexible track having a series of perforations is used with a carriage having a large, vertically oriented drive sprocket. The drive sprocket is studded about its periphery with spherical members adapted to mesh with the track perforations. While the Harris system is capable of carrying relatively heavier loads than the cable system discussed above, a problem with the Harris system is that the Harris drive system inherently produces non-uniform, ripple-like motion of the carriage. Such non-uniform motion is detrimental to smooth operation of the tool mounted on the carriage. Also, as with the Cable system described above, the use of a large, vertically oriented drive sprocket tends to make the drive system rather unwieldy.

Therefore, it is an object of the invention to provide a flexible track system which reduces the amount of tooth deformation when the track is conformed to a non-planar work surface. It is additionally an object of the invention to provide a track having a rack structure capable of supporting and directing heavy loads without adversely impacting upon the flexibility of the track. It is also an object of the invention to provide a carriage assembly for supporting a tool, such as a welding or cutting device, which is capable of being quickly and easily attached to or removed from the track system. It is further an object of the invention to provide a track system having a rack profile which permits substantially uniform motion of a supported carriage on straight as well as on curved surfaces.

SUMMARY OF THE INVENTION

A track and carriage system is provided for moving a work piece along a flexible track. The system includes a track having at least one track segment, the track segment including a rack assembly formed by a plurality of spaced rack members mounted on the track segment. A carriage assembly is configured to move along the track. The carriage assembly preferably includes a first carriage and a second carriage, which may be removably mounted on the track. A link assembly extends between the two carriages to connect the two carriages as they move along the track. Additional carriages may be connected to the first or second carriages by additional link assemblies.

DESCRIPTION OF THE PREFERRED EMBODIMENTS

For purposes of the description hereinafter, the terms "upper," "lower," "right," "left," "vertical," "horizontal,"

"top," "bottom" and derivatives and equivalents thereof shall relate to the invention as it is oriented in the drawing figures. However, it is to be understood that the invention may assume various alternate variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 1:
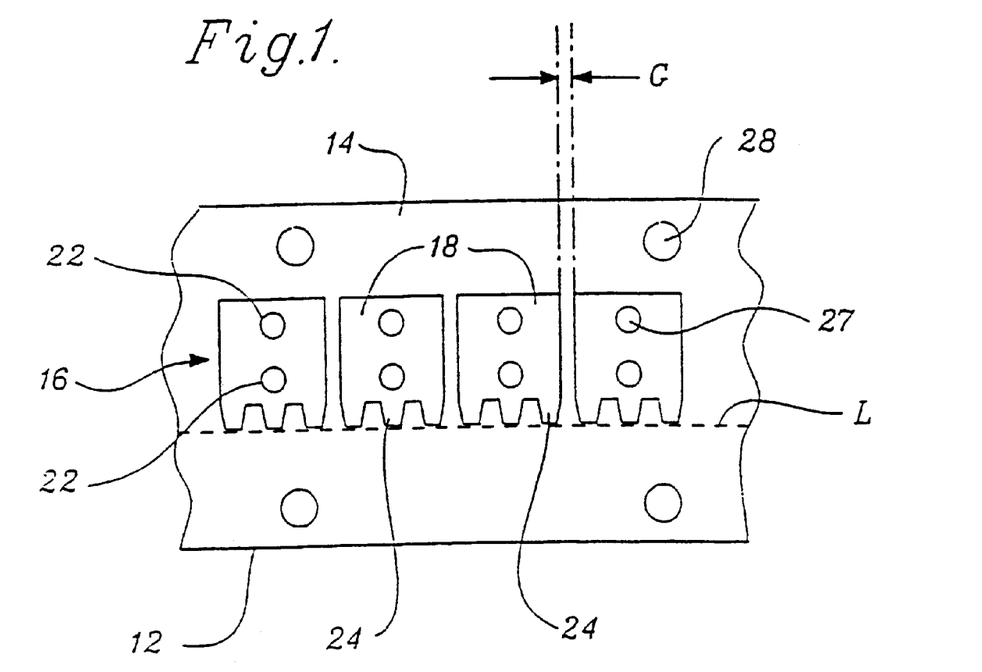
FIG. 1 is a plan view of a modular track segment of the invention.
Figure 2:
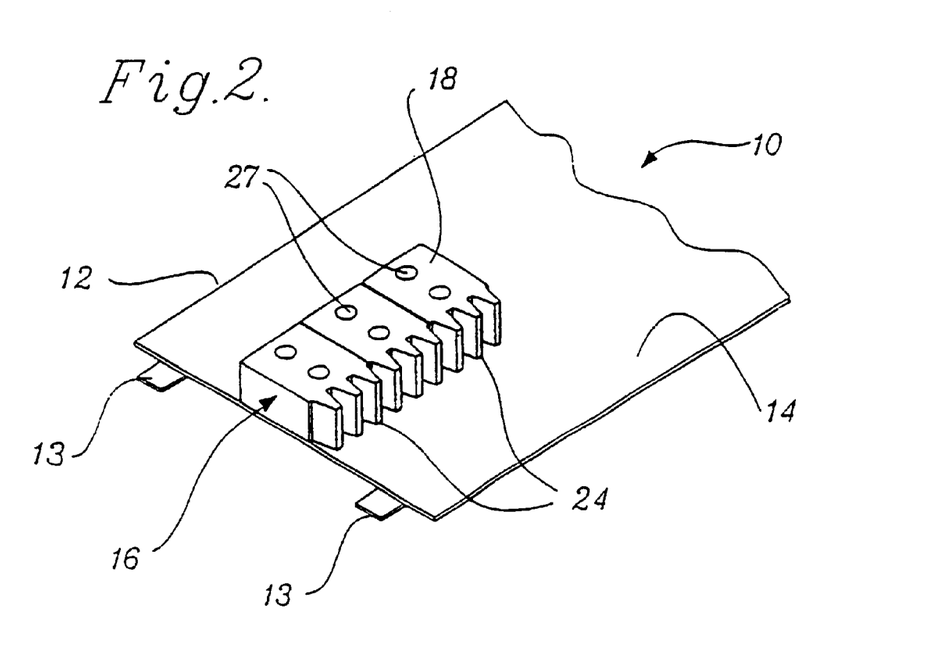
FIG. 2 is an end, elevational view of the track segment shown in FIG. 1.
Figure 7:
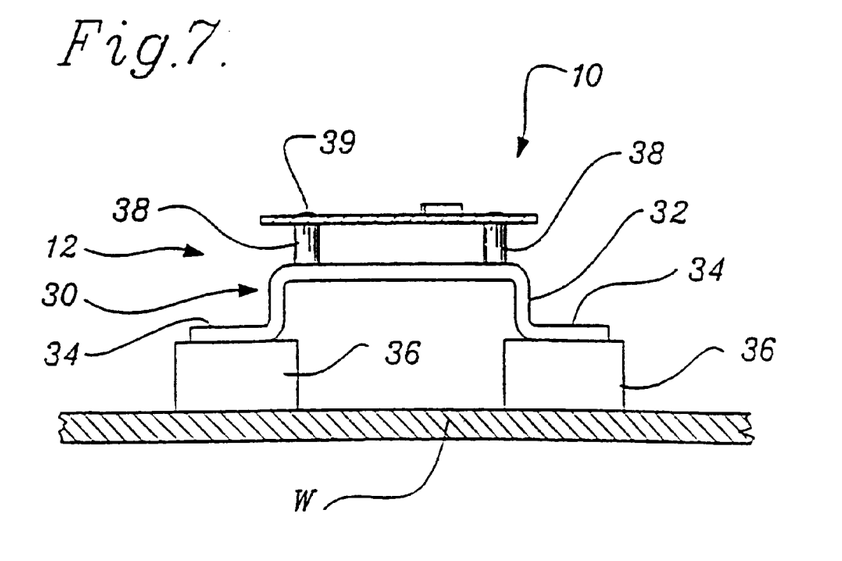
FIG. 7 is an end view of a track assembly of the invention mounted on a workpiece.

A flexible track system is generally designated 10 in FIG. 7 of the drawings. The track system 10 is formed by a plurality of track segments 12, as shown for example in FIG. 1, assembled in end-to-end relationship. Each track segment 12 includes connector elements 13, such as conventional tab and slot connections, screw-type or bayonet connectors preferably mounted on the ends of the track segment 12, to allow adjacent track segments 12 to be connected together to form a desired length of track. As shown in FIGS. 1 and 2, each track segment 12 includes a base strip 14 having a top, bottom, opposed ends, and opposed sides. The base strip 14 is preferably substantially rectangular and is preferably made from flexible, high-strength steel. The base strip 14 is preferably about 59.5 inches long, about 4.0 inches wide and about 0.078 inch thick.

Figure 5:
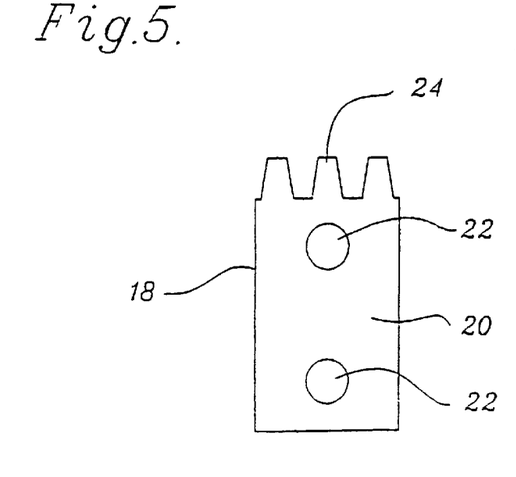
FIG. 5 is a plan view of a rack member of the invention.
Figure 6:
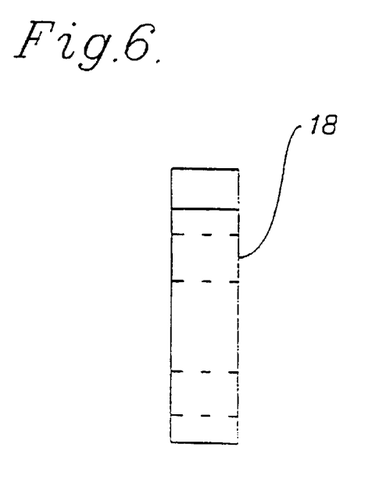
FIG. 6 is a side view of the rack member shown in FIG. 5.

A rack assembly 16 is removably attached to the top of the base strip 14 and extends substantially longitudinally along the length of the base strip 14. The rack assembly 16 is formed by a plurality of rack members 18 attached to the top of the base strip 14. As shown in FIGS. 5 and 6, each rack member 18 includes a substantially rectangular body 20 having a pair of spaced apart rack mounting holes 22. Teeth 24 are formed on one end of the rack member 18 and are preferably substantially trapezoidal in shape, which is the mathematical equivalent to an involute contour on a straight track. The rack member 18 is preferably made of steel and has a length of about 1.0 inch and a width of about 0.54 inch and a thickness of about 0.25 inch. Each rack member 18 preferably has three teeth 24 having a 14½° pressure angle on a ¼ inch face.

Figure 3:
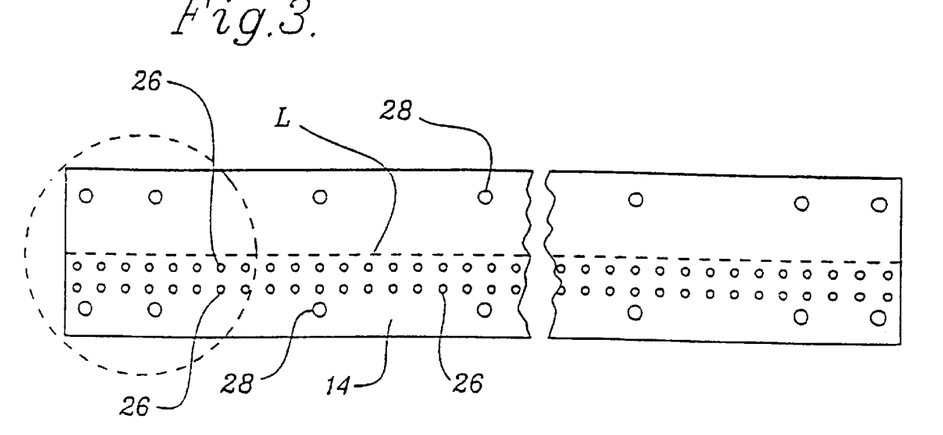
FIG. 3 is a plan view of a track base strip.
Figure 4:
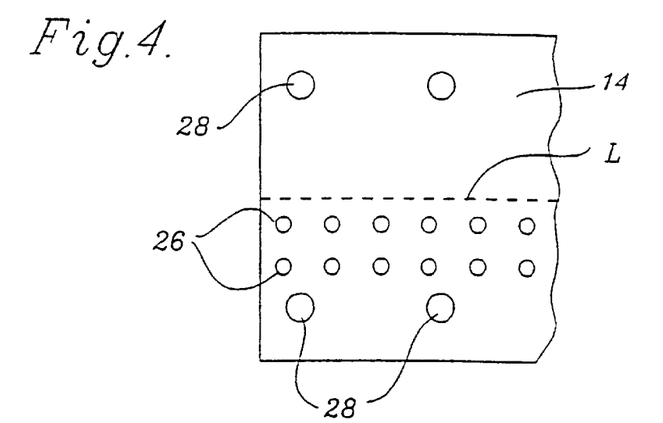
FIG. 4 is an enlarged view of the left end of the base strip shown in the dashed circle in FIG. 3.

As shown in FIGS. 3 and 4, the base strip 14 includes a plurality of spaced apart pairs of track mounting holes 26 extending along the length of the base strip 14. The rack members 18 are attached to the base strip 14 by conventional fastening elements 27, such as screws or threaded bolts, which extend through the mounting holes 22 on the rack members 18 and engage the mounting holes 26 on the base strip 14. The base strip 14 also includes a plurality of pairs of spaced apart cross member mounting holes 28.

As shown in FIG. 7, a plurality of cross members 30 are attached to the bottom of the base strip 14 in conventional manner, for example, by rivets, screws or threaded bolts. The cross members 30 include a substantially U-shaped frame 32 having opposed, substantially L-shaped legs 34 extending from the sides of the frame 32. Attaching elements 36, such as magnets or suction cups, are attached to the bottom of each leg 34. Upwardly directed screw receiving members 38, such as tubular spacers, are attached to the top surface of the frame 32. To connect a frame 32 to the bottom of the base strip 14, fastening elements, such as screws or threaded bolts, are inserted through the cross member mounting holes 28 and into the screw receiving members 38 on top of the frame 32 to hold the frame 32 to the base strip 14. The attaching elements 36 are used to attach each track segment 12 to a workpiece W. The track segments 12 are sufficiently flexible such that they conform to the contour of the workpiece W. Thus, by attaching a plurality of track segments 12 together in an end-to-end relationship by their connector elements 13, a track system 10 of a desired length may be formed on the workpiece W.

As shown in FIGS. 1 and 2, adjacent rack members 18 are attached to the top of the base strip 14 with a space or gap G formed between adjacent rack members 18. The gap G is preferably about 0.040 inch. This space allows the base strip 14 to flexibly conform to the shape of the workpiece W without substantially adversely impacting upon the structure of the rack assembly 16, thus allowing for a smooth operation of a welding or cutting device along the length of each rack assembly 16 and hence along the entire length of the flexible track system. As shown in FIGS. 2 and 3, the mounting holes 22 and 26 are positioned, and the rack members 18 are configured, such that when the rack members 18 are connected to the base strip 14, the ends of the teeth 24 substantially align with the longitudinal axis L of the base strip 14.

Figure 8:
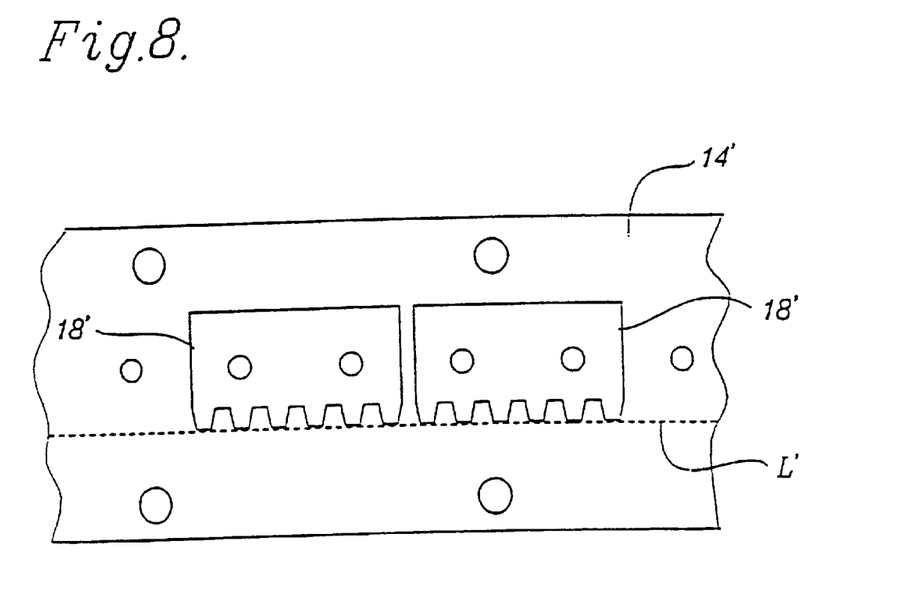
FIG. 8 is a plan view of an alternative embodiment of a rack member of the invention.

In the preferred embodiments of the base strip 14 and rack members 18 discussed above, each rack member 18 has a longitudinal axis substantially perpendicular to the longitudinal axis L of the base strip 14. An alternative base strip 14' and rack member 18' is shown in FIG. 8 of the drawings. In the alternative embodiment, the rack member 18' is wider than rack member 18 and has a longitudinal axis substantially parallel to a longitudinal axis L' of the base strip 14'. Additionally, the mounting holes 26' on the base strip 14' are arranged linearly, rather than in transversely spaced pairs as with the base strip 14.

The track system 10 described above provides significant improvements over previously known track systems. For example, the rack assembly 16 itself does not have to flex to conform to the surface of the workpiece W since the rack assembly 16 is not a unitary piece. In the present invention, the spaces between the adjacent rack members 18 allow the base strip 14 to flex without flexing the individual rack members 18. Thus, each rack member 18 can be made of substantially harder, thicker and more durable metal than the racks of the prior art systems to permit much heavier loads to be carried along the track system 10 than in the previously known track systems.

Figure 9:
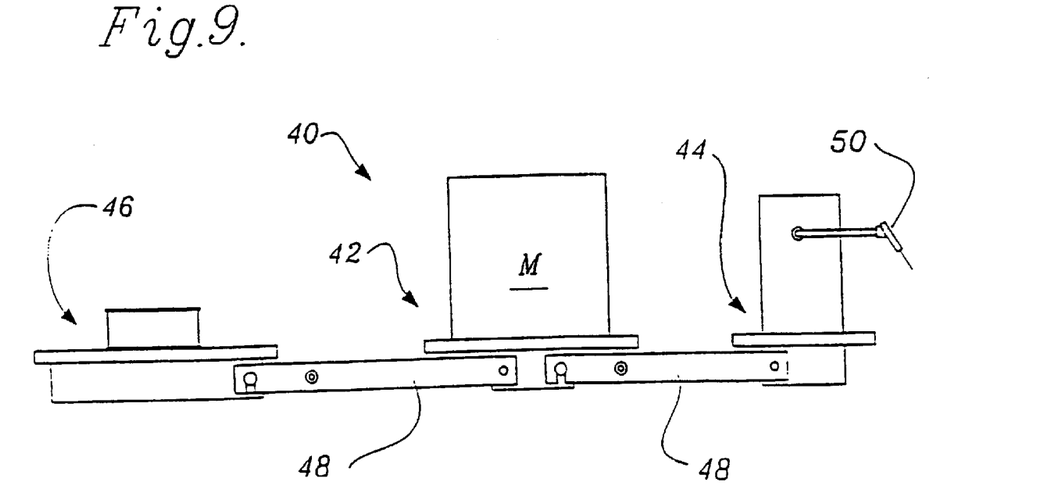
FIG. 9 is a side view of a carriage assembly of the invention.
Figure 10:
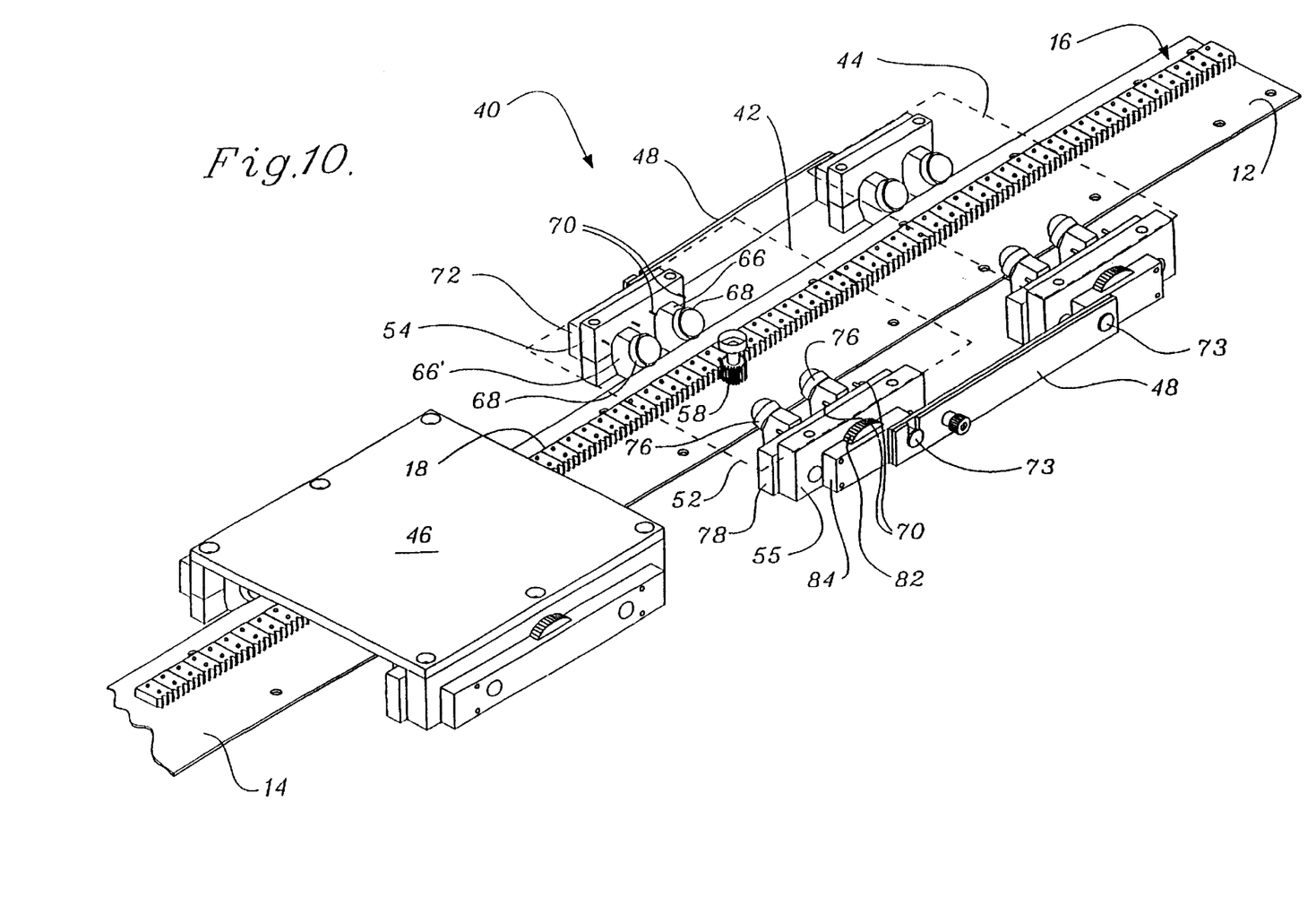
FIG. 10 is a broken, elevational view of the lower part of the carriage assembly shown in FIG. 9 mounted on a track.

A carriage assembly particularly well suited for use with the above-described track system 10 is generally designated 40 in FIGS. 9–15 and 19 of the drawings. As shown in FIG. 9, the carriage assembly 40 preferably includes a motor carriage 42, a deck carriage 44 and a trailer carriage 46 pivotably connected by link assemblies 48. As described hereinbelow, each carriage has a substantially planar platform mounted on top of wheel assemblies configured to engage the flexible track system 10.

The motor carriage 42 carries a motor M, such as an electric motor, to propel the carriage assembly 40 along the track system 10, as described hereinbelow. The deck carriage 44 carries a tool 50, such as a torch, cutting unit, weaver unit or other such cutting or welding unit to work on the workpiece W. The trailer carriage 46 may be used for carrying heavy loads, on the order of 50–100 pounds, such as wire feeder or wire spool.

Figure 14:
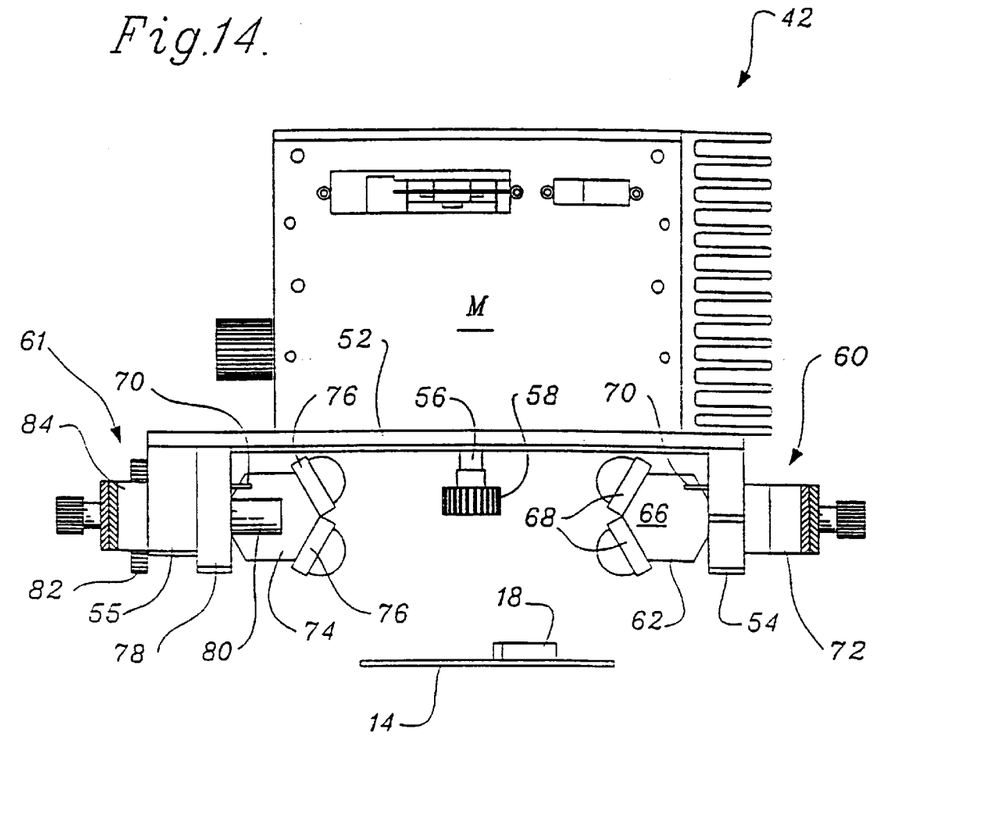
FIG. 14 is an end, exploded view of a motor carriage and track of the invention.
Figure 15:
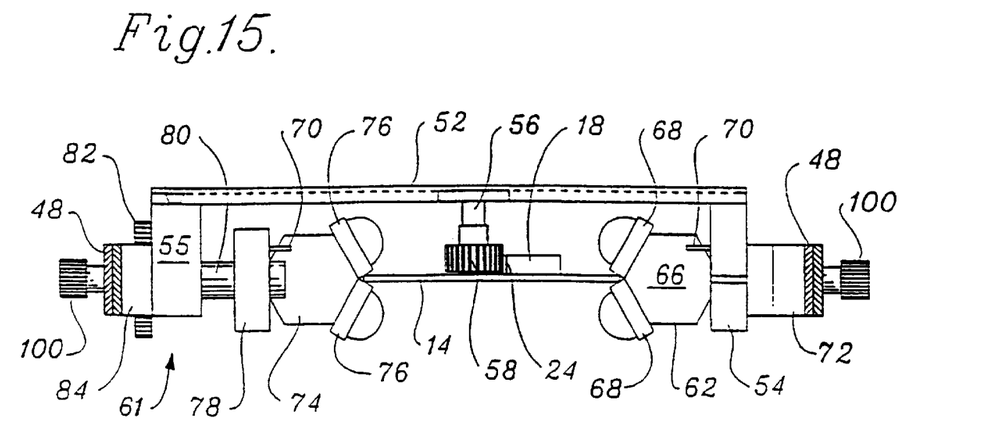
FIG. 15 is an end view of the motor carriage of FIG. 14 mounted on the track.

Looking first at the motor carriage 42, as shown in FIGS. 14 and 15 of the drawings, the motor carriage 42 includes a platform 52 having a pair of opposed flanges 54, 55 depending from the sides of the platform 52. The motor M is attached, such as by bolting, to the top of the platform 52. A shaft 56 having a pinion gear 58 extends through the platform 52 such that the teeth on the pinion gear 58 engage the teeth 24 on the rack members 18 when the motor carriage 42 is attached to the track. The motor carriage 42 includes opposed wheel assemblies 60, 61 that are configured to ride along the edges of the base strip 14.

Figure 13:
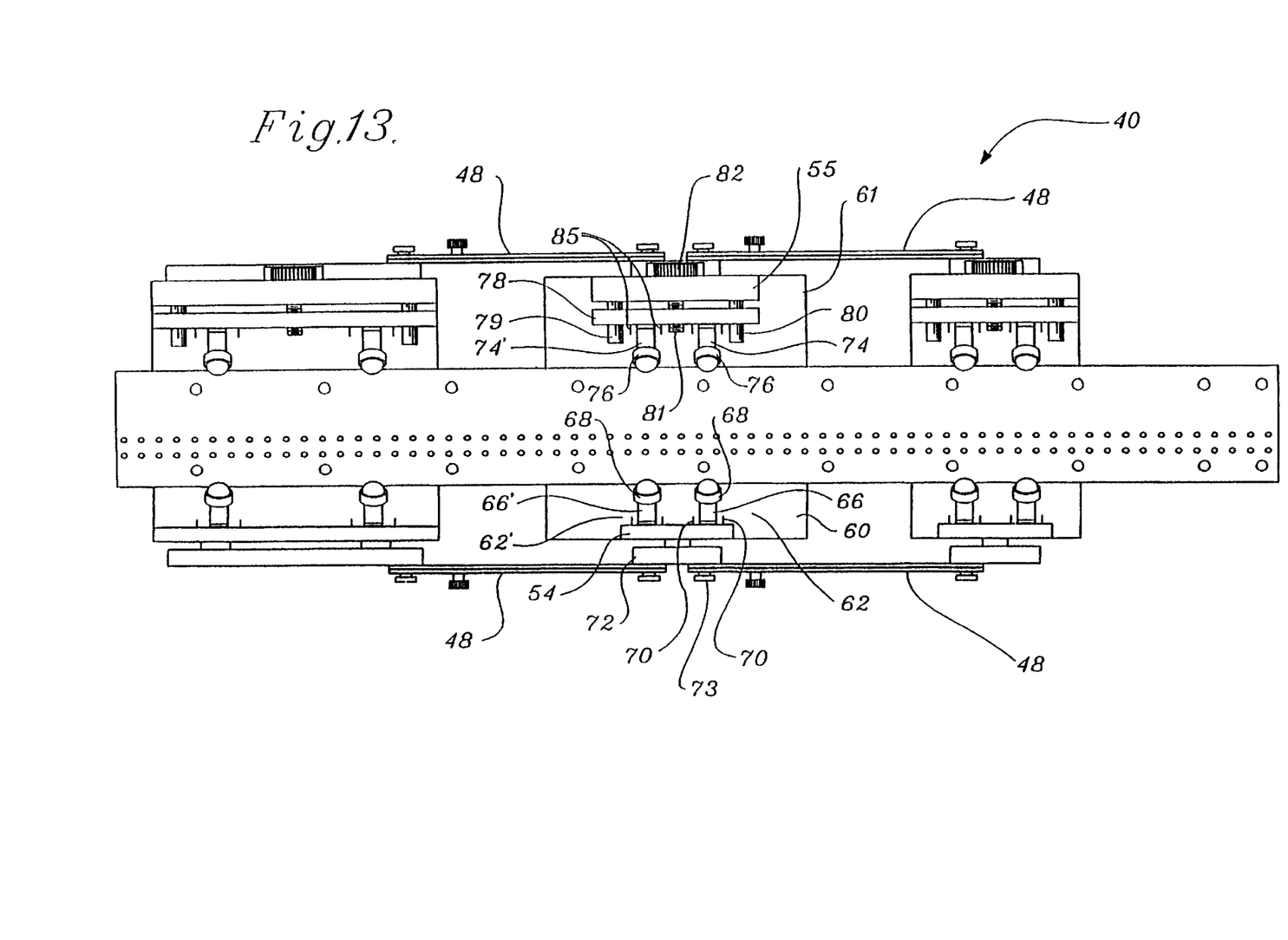
FIG. 13 is a bottom view of the track system of the invention.

As shown in FIGS. 13–15 of the drawings, the right side wheel assembly 60 includes a pair of substantially rectangular, spaced-apart wheel blocks 62, 62' each preferably pivotally mounted, for example on a post, to the right side flange 54. Alternatively, the wheel blocks 62, 62' can be non-pivotally mounted to the flange 54. Each wheel block 62, 62' has a base 66, 66' with a pointed forward end defining a pair of angled faces. Wheels 68 are rotatably mounted on each angled face, for example, by a post. Each wheel block 62, 62' preferably has a total of two wheels 68. A pair of spaced pivot stops 70 are located on the inner surface of the right side flange 54 adjacent the sides of each wheel block 62, 62' to limit the pivotal range of the wheel blocks 62, 62'. An extension block 72, is attached to the outer surface of the right flange 54, for example, by welding. A pair of connection posts 73, such as shoulder screws, are attached to the outer surface of the extension block 72, for example, by engaging a threaded hole in the extension block 72. The pair of connection posts 73 is used as a connecting point for the link assembly 48, as will be described hereinbelow.

Looking at the left side wheel assembly 61, this wheel assembly 61 includes a pair of wheel blocks 74, 74' each having two pairs of rotatably mounted wheels 76, similar to the right side wheel blocks 62, 62' discussed above. However, the wheel blocks 74, 74' are each preferably pivotally attached, for example, by a post, to an end block 78. Alternatively, the wheel blocks 74, 74' can be non-pivotally attached to the end block 78. As shown in FIG. 13, a pair of slide bars or rods 79, 80 are attached to, and extend from, the inner side of the flange 55. The end block 78 has holes through which the rods 79, 80 extend such that the end block 78 is slidable along the rods 79, 80. The end block 78 has a central, threaded bore which engages the threaded shaft of a screw 81 extending through the left side flange 55.

A knob 82 is attached to the outer end of the screw 81. Thus, by rotating the knob 82, the end block 78 is slidable along the rods 79, 80 and hence the wheel blocks 74, 74' may be moved toward and away from the side of the base strip 14. With the wheel blocks 74, 74' moved to their outermost position, the motor carriage 42 can be positioned on the base strip 14 and then the knob 82 turned to move the left side wheel blocks 74, 74' inwardly until the wheels 76 on the left side wheel blocks 74, 74' engage the left side of the base strip 14, as shown in FIG. 14A. To remove the motor carriage 42 from the track system 10, the knob 82 can be rotated in the opposite direction to move the wheel blocks 74, 74' outwardly, disengaging the motor carriage 42 from the track. Thus, the motor carriage 42 can be attached to or removed from the track system 10 without having to slide the motor carriage 42 off one end of the track system 10.

A pair of pivot stops 85 are located on the inner surface of the end block 78 adjacent each wheel block 74, 74' to limit the pivot ability of the wheel blocks 74, 74'. The distance between the centers of rotation of the wheel blocks 62, 62' and 74, 74' is preferably about 1–3 inches, more preferably about 3", such that pinion rise is negligible and has substantially no impact on the smoothness of motion of the carriage assembly 40 and the transfer of force between the carriage assembly 40 and the track system 10.

As shown in FIGS. 11–15, a substantially U-shaped shield 84 is attached to the left flange 55 and extends around the knob 82. A pair of connection posts 73 is attached to the outer side of the shield 84, such as by engaging a threaded hole in the shield 84, and is used as connecting points for the link assemblies 48, as described hereinbelow. The deck carriage 44 and the trailer carriage 46 have similar wheel assemblies to those of the motor carriage 42 and are, therefore not separately described. The distance between the wheel blocks of the deck carriage 44 is substantially the same as that of the motor carriage 42. However, as shown in FIG. 13, the distance between the wheel blocks of the trailer carriage 46 may be larger.

Figure 11:
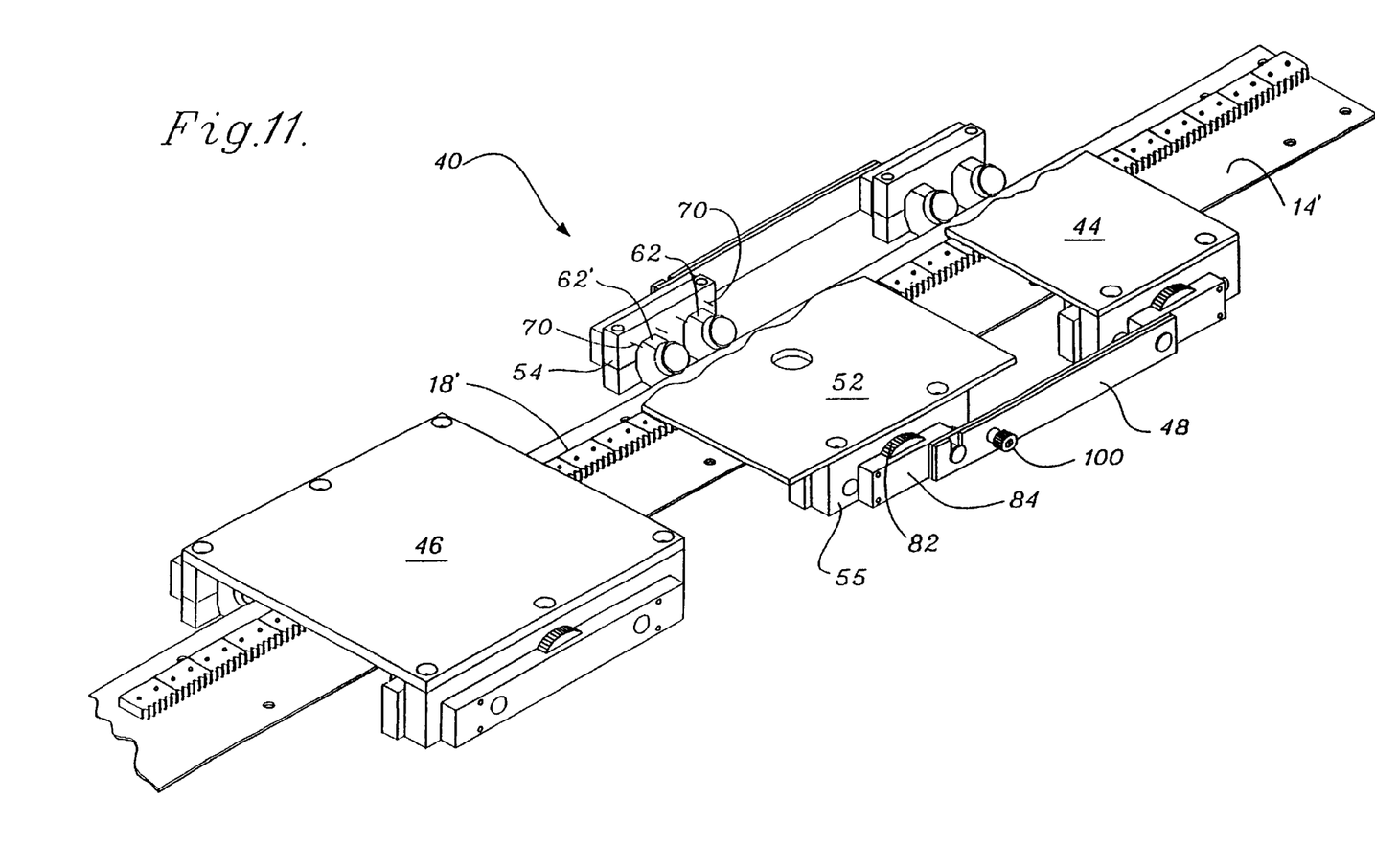
FIG. 11 is a modified, elevational view of the lower part of the carriage assembly shown in FIG. 10.
Figure 12:
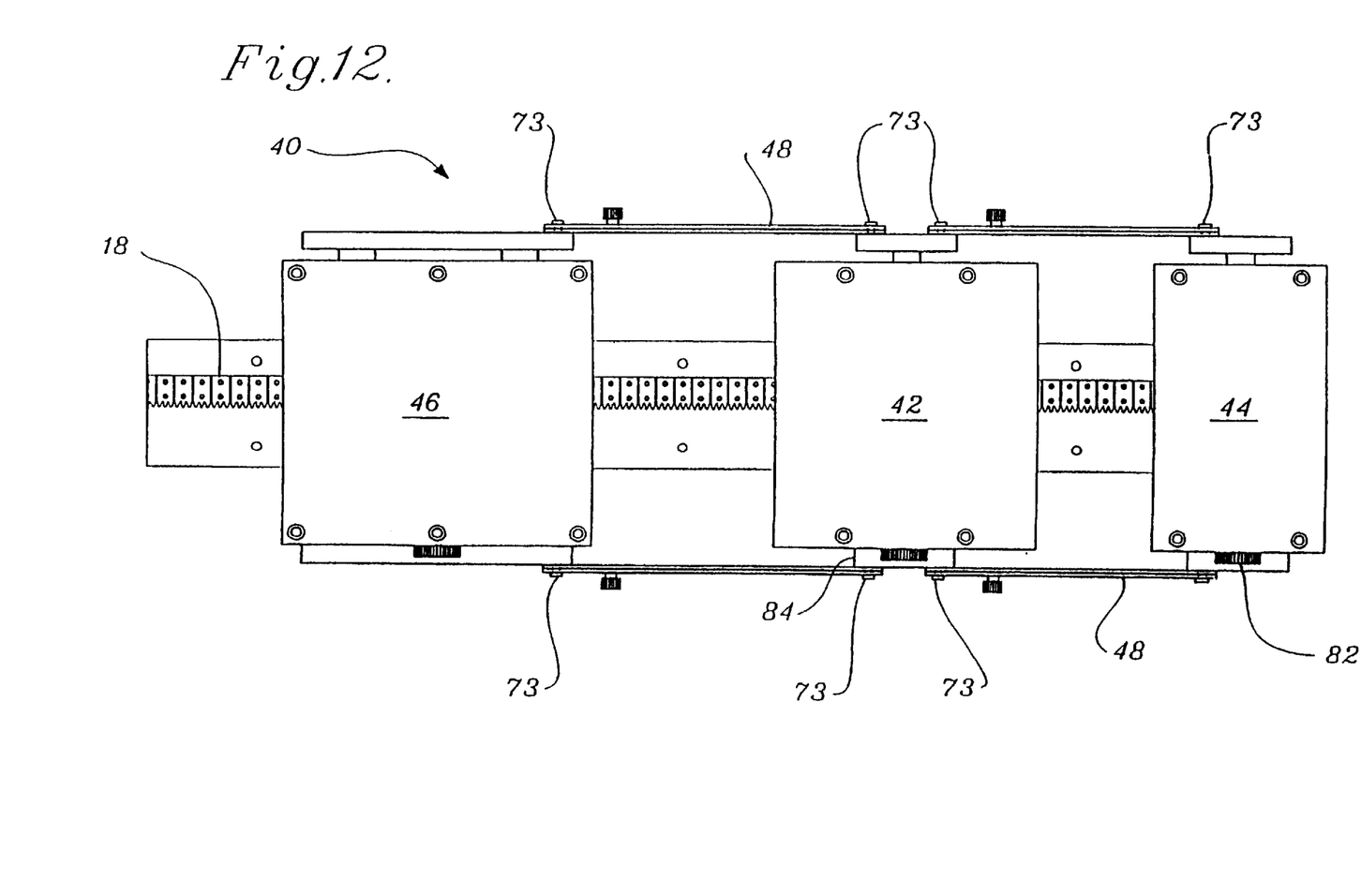
FIG. 12 is a plan view of the carriage assembly of the invention mounted on a track.
Figure 16:
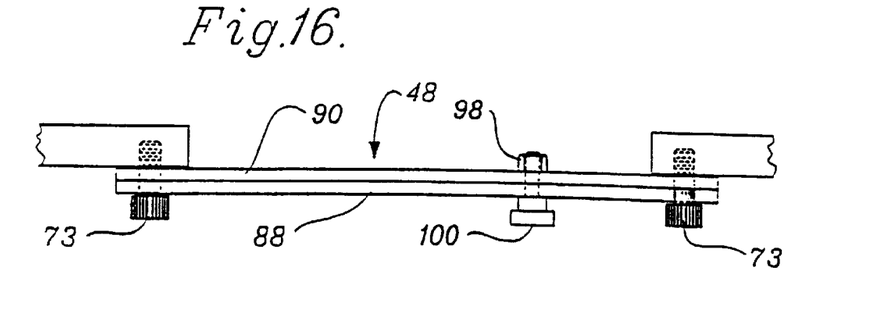
FIG. 16 is an enlarged, plan view of a link assembly of the invention.
Figure 17:
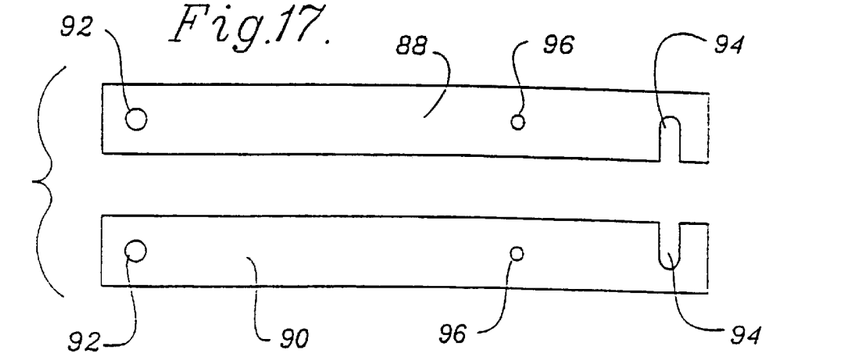
FIG. 17 is a side view of the link elements of the link assembly shown in FIG. 16.
Figure 18:
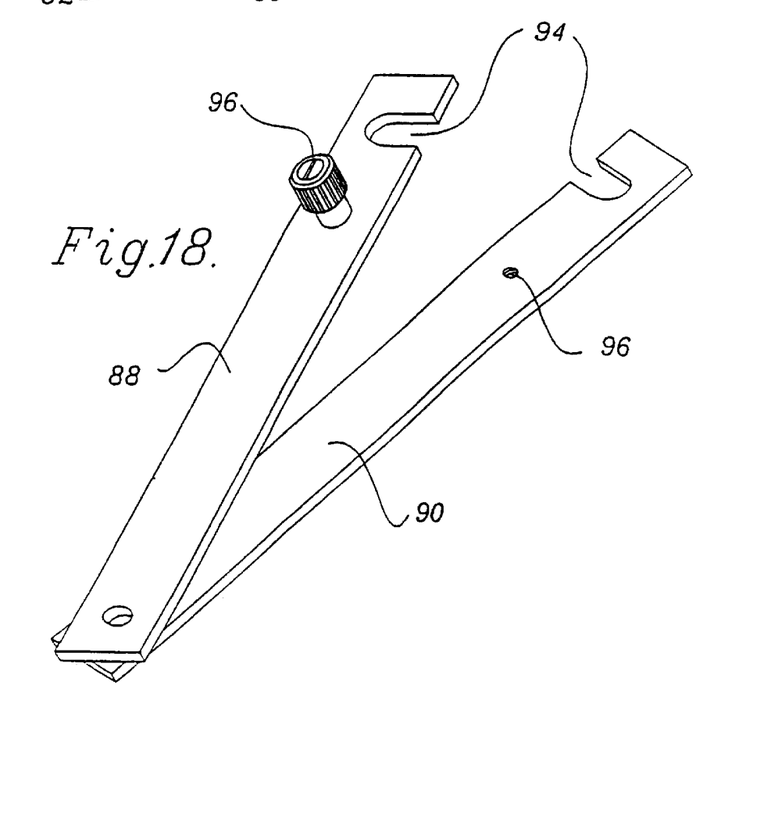
FIG. 18 is an elevational view of the link elements of FIG. 17 in an opened position.

As shown in FIGS. 11–13, adjacent carriages are connected by link assemblies 48. As shown in FIGS. 16–18, each link assembly 48 is formed by a pair of elongated link elements 88, 90. Each link element 88, 90 has a hole 92 located near one end, a slot 94 located near the other end and an attachment element 96 located between the hole 92 and the slot 94. On one link element 88, the attachment element is configured as an attached nut 98 and on the other link element 90, the attachment element is configured as a captive bolt 100 which is configured to engage the attached nut 98 on the other link element 88.

As shown in FIGS. 11–13, the ends of the link elements 88, 90 with the holes 92 are connected to one carriage, for example, the motor carriage 42, by a connection post 73. The connection post 73 can be formed by a shoulder bolt which passes through the holes 92 in the link elements 88, 90 and into a threaded bore. The link elements 88, 90 are thus free to pivot in a scissor-like motion around the connection post 73, as shown in FIG. 18. The free ends of the link elements 88, 90 are then closed around the connection post 73 on the adjacent carriage such that the slots 94 of the link elements 88, 90 capture the connection post 73 on the other carriage. The attachment elements 96 are then engaged to hold the link elements 88, 90 together, thus connecting the two carriages. A similar attachment is also made on the other side of each carriage. Thus, each end of the link assembly 48 is pivotally connected to one of the carriages.

To disconnect the carriages, the attachment elements 96 can be disengaged and the link elements 88, 90 pivoted to their open position.

Figure 19:
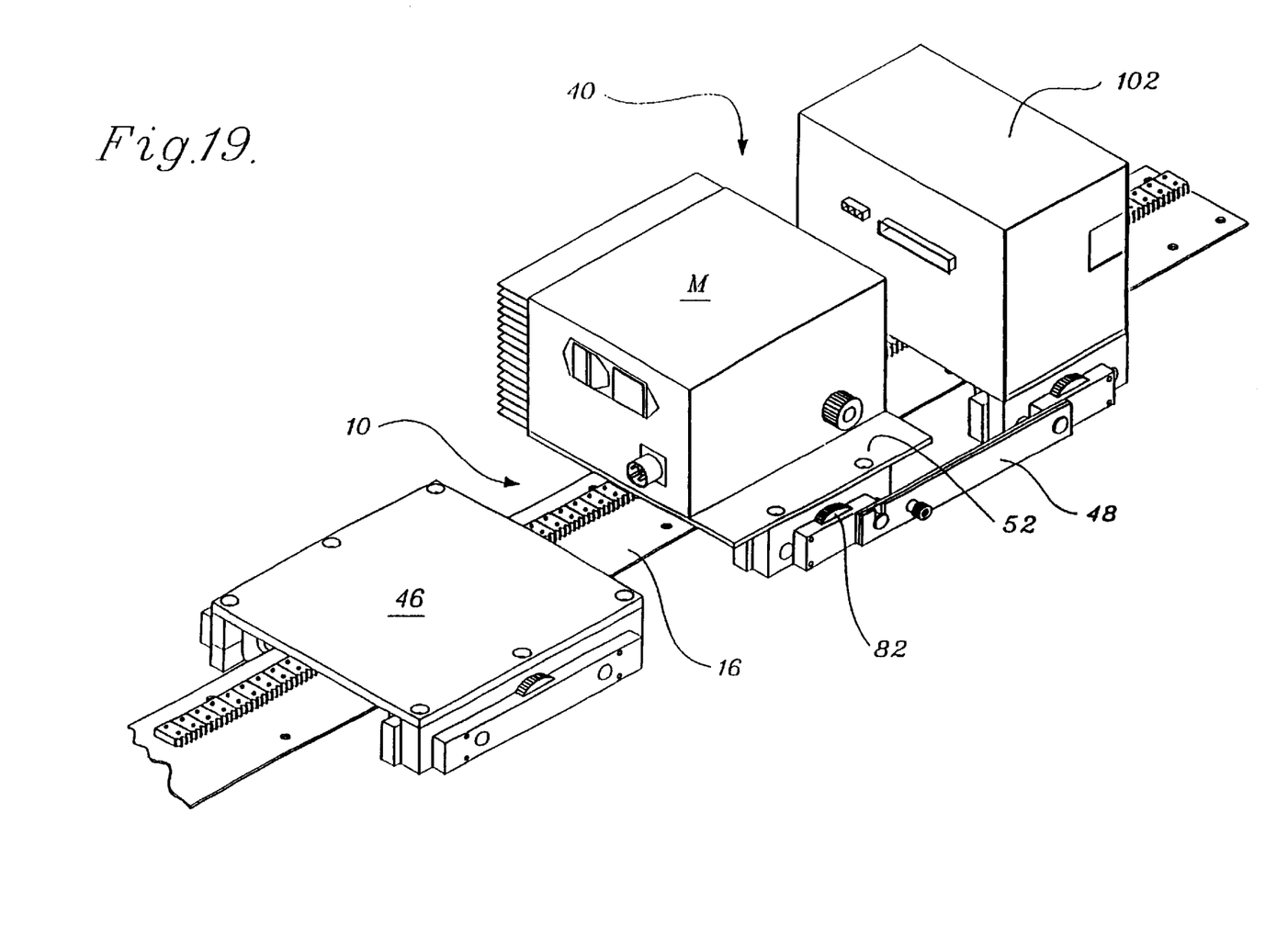
FIG. 19 is a side view of a carriage assembly of the invention having a weaver unit.

Not all of the carriages 42, 44, 46 need be connected at the same time. If no auxiliary equipment is required, the trailer carriage 46 can be disconnected and just the motor carriage 42 and deck carriage 44 are used. As shown in FIG. 19 of the drawings, various work tools, such as a weaver unit 102, can be mounted on the deck carriage 44.

Alternatively, a tool can be mounted directly on the motor carriage 42 and the deck carriage 44 and trailer carriage 46 not used.

Figure 20:
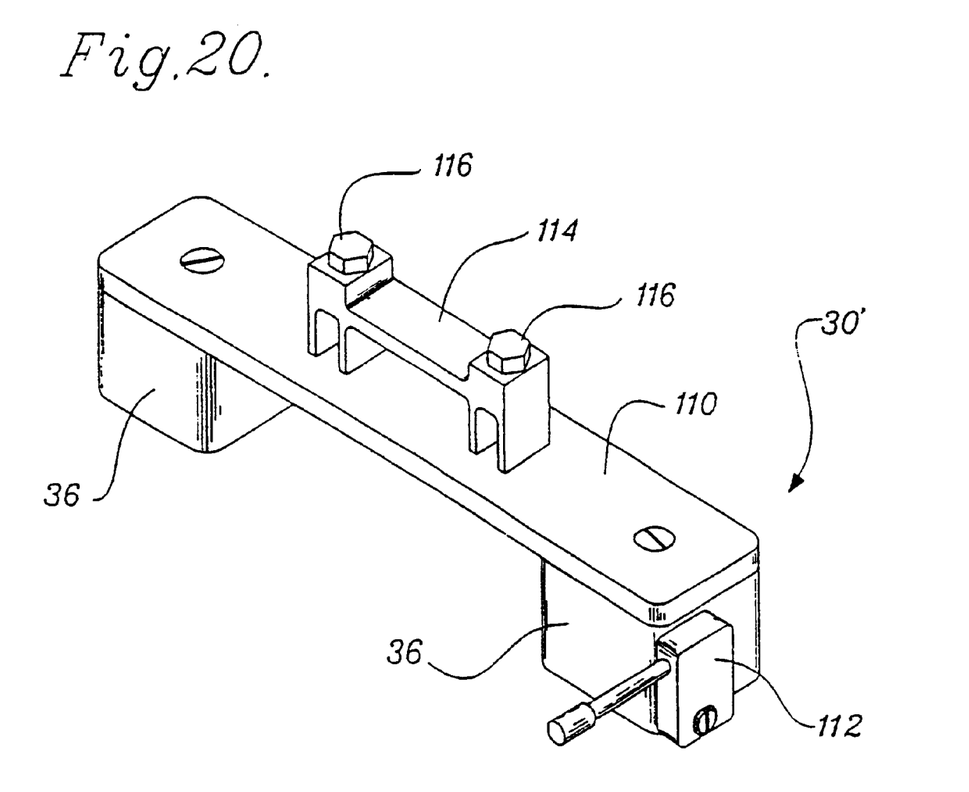
FIG. 20 is an elevational view of a cross member of the invention.

An alternative embodiment of the cross member of the invention is designated 30' in FIG. 20 of the drawings. The cross member 30' includes a substantially planar cross element 110 with attaching elements 36 mounted on the bottom of the cross element 110. A conventional release member 112, such as a conventional lever assembly, may be mounted on each attaching element 36 to help release the attaching elements 36 from the workpiece W. A substantially H-shaped support 114 is mounted on the cross element 110 with fastening elements 116 engageable with the support 114. A base strip 14 of a track is mounted to the cross member 30' by passing the fastening elements 116 through the cross member mounting holes 28 and into threaded bores in the top of the support 114.

The above-described carriage assembly 40 provides significant improvements over the carriages of the prior art. For example, since the weight of the carriage assembly 40 is spread over a larger area along the track, there is less tendency for significant track deformation caused by the weight of the carriage, which deformation can adversely impact upon the positioning of the tool as the tool is moved along the track. With the link assemblies 48 of the invention, deck carriages 44 having different tools can quickly and easily be interchanged if need be. Additionally, since the motor is located on a different carriage, any localized track deformation imparted by the weight of the motor will not adversely affect the position of the tool on the deck carriage 44. The deck carriage 44 being lightly loaded does not substantially deflect the rail under it so the tool has a smooth motion decoupled from deflection of the motor carriage. Further, the use of trapezoidal teeth on the rack assembly, i.e., an involute profile, ensures a smooth, uniform motion of the tool. Also, the positioning of the pinion gear 58 of the motor carriage 42 substantially in the middle of the carriage 42 ensures that the pinion gear 58 remains aligned with the rack teeth 24, i.e., there is substantially no angular displacement between the pinion gear 58 and the rack teeth 24.

The preferred embodiments of the invention have been described in detail herein. However, it will be appreciated by those skilled in the art that various modifications and alternatives to the preferred embodiments may be made to the invention without departing from the concepts disclosed in the foregoing description. Such modifications are to be considered as included within the following claims unless the claims, by their language, expressly state otherwise. Accordingly, the particular embodiments described in detail hereinabove are illustrative only and are not limiting as to the scope of the invention, which is to be given the full breadth of the appended claims and any and all equivalents thereof.

We claim:

1. A flexible track and carriage system, comprising:
   a flexible track having at least one track segment, said at least one track segment including a flexible base strip with a rack assembly mounted on said base strip, said rack assembly including a plurality of spaced rack members, each rack member having at least one tooth;
   a carriage assembly including a first carriage and a second carriage, said carriage assembly configured to ride along said track; and
   at least one link assembly extending between and pivotally connected to said first and second carriages such that said first carriage is spaced from said second carriage when said carriage assembly is mounted on said track.

2. The system as claimed in claim 1, including a plurality of flexible track segments, each track segment including connector elements with adjacent track segments connected by said connector elements to form said track.

3. The system as claimed in claim 1, wherein at least one base segment includes at least one cross member mounted on said at least one base strip, said cross member including at least one attaching element.

4. The system as claimed in claim 1, wherein said first carriage includes a motor and said second carriage includes a tool for working on a work piece.

5. The system as claimed in claim 1, wherein each carriage includes at least one connection post, with said at least one link assembly connected to said connection posts of said first and second carriages.

6. The system as claimed in claim 1, wherein said at least one link assembly includes a pair of elongated link elements, with each link element having a first end and a second end, and with each link element having a hole located adjacent said first end and a slot located adjacent said second end.

7. The system as claimed in claim 1, wherein each rack member includes a substantially rectangular body having a plurality of substantially trapezoidally shaped teeth.

8. The system as claimed in claim 7, wherein said base strip has a longitudinal axis and the ends of said teeth substantially align with said longitudinal axis of said base strip.

9. The system as claimed in claim 8, wherein said rack members include a longitudinal axis and the longitudinal axis of said rack members is substantially perpendicular to said longitudinal axis of said base strip.

10. The system claimed in claim 8, wherein said rack members include a longitudinal axis and the longitudinal axis of said rack members is substantially parallel to said longitudinal axis of said base strip.

11. The system as claimed in claim 1, wherein said first carriage includes a first wheel assembly and a second wheel assembly, with said first wheel assembly movable towards and away from said second wheel assembly to mount and remove said carriage assembly on said track.

12. The system as claimed in claim 11, wherein said second wheel assembly includes a pair of spaced wheel blocks mounted on said carriage, each wheel block including a base having a pair of angled faces and a wheel mounted on each said angled face.

13. The system as claimed in claim 12, wherein said wheel blocks are mounted on an end block.

14. The system as claimed in claim 13, wherein said first carriage includes a flange having an inner surface and an outer surface, with a pair of rods extending from said inner surface of said flange, and wherein said end block is slidably movable along said rods.

15. The system as claimed in claim 14, wherein said end block is connected to a screw element configured to move said end block along said rods.

16. The system as claimed in claim 14, including a shield attached to said outer surface of said flange with a pair of connection posts carried on said shield.

17. A flexible track and carriage system, comprising:
    a flexible track having at least one track segment, said at least one track segment including a flexible base strip with a rack assembly mounted on said base strip, said rack assembly including a plurality of spaced rack members, each rack member having at least one tooth;
    a carriage assembly including a first carriage and a second carriage, said carriage assembly configured to ride along said track; and
    at least one link assembly extending between and pivotally connected to said first and second carriages such that said first carriage is spaced from said second carriage when said carriage assembly is mounted on said track,
    wherein said first carriage includes a first wheel assembly and a second wheel assembly, with said first wheel assembly movable towards and away from said second wheel assembly to mount and remove said carriage assembly on said track, and
    wherein said first wheel assembly includes two spaced wheel blocks mounted on said carriage, each wheel block including a base with a pair of angled faces, with a wheel mounted on each angled face.

18. A flexible track and carriage system, comprising:
    a flexible track having at least one track segment, said at least one track segment including a flexible base strip with a rack assembly mounted on said base strip, said rack assembly including a plurality of spaced rack members, each rack member having at least one tooth;

a carriage assembly including a first carriage and a second carriage, said carriage assembly configured to ride along said track; and at least one link assembly extending between and pivotally connected to said first and second carriages such that said first carriage is spaced from said second carriage when said carriage assembly is mounted on said track, wherein said at least one link assembly includes a pair of elongated link elements, with each link element having a first end and a second end, and with each link element having a hole located adjacent said first end and a slot located adjacent said second end, and wherein said link assembly includes an attachment element to hold said link assembly in a closed position.

19. A flexible track system, comprising:

at least one flexible track segment, said at least one track segment including:

a flexible base strip; and a rack assembly mounted on said base strip, wherein said rack assembly includes a plurality of spaced, solid metal rack members, and wherein each rack member has at least one tooth formed on an end of the rack member such that the at least one tooth extends laterally with respect to the rack member.

20. A flexible track and carriage system, comprising:

a flexible track having at least one flexible track segment, said at least one track segment including a flexible base strip with a rack assembly mounted on said base strip, said rack assembly including a plurality of spaced rack members with each rack member having at least one tooth; and a carriage assembly said carriage assembly configured to ride along said track, said carriage assembly including at least one carriage, wherein said at least one carriage includes a first wheel assembly and a second wheel assembly, with said first wheel assembly movable towards and away from said second wheel assembly to mount and remove said carriage assembly on said track.

21. The system as claimed in claim 20, wherein said first wheel assembly includes at least one wheel block mounted on said at least one carriage, said at least one wheel block including at least one wheel mounted thereon.

* * * * *

UNITED STATES PATENT AND TRADEMARK OFFICE
CERTIFICATE OF CORRECTION

PATENT NO. : 6,494,307 B1
DATED : December 17, 2002
INVENTOR(S) : Kozak et al.

It is certified that error appears in the above-identified patent and that said Letters Patent is hereby corrected as shown below:

<u>Title page,</u>
Item [57], ABSTRACT, "Cove along" should read -- move along --.

<u>Column 10,</u>
Line 10, between "assembly" and "said" insert comma -- , --.

Signed and Sealed this

Twenty-fourth Day of June, 2003

JAMES E. ROGAN
*Director of the United States Patent and Trademark Office*